Feb. 11, 1964 M. HALLINAN 3,121,218
SAFETY FLIGHT FLUTTER DAMPER
Filed March 21, 1963 2 Sheets-Sheet 1

INVENTOR
Mark Hallinan

BY
Claude Funkhouser
ATTORNEY
Cornelius J. Husar
AGENT

Feb. 11, 1964  M. HALLINAN  3,121,218
SAFETY FLIGHT FLUTTER DAMPER
Filed March 21, 1963  2 Sheets-Sheet 2

United States Patent Office 3,121,218
Patented Feb. 11, 1964

3,121,218
SAFETY FLIGHT FLUTTER DAMPER
Mark Hallinan, Beverly, Mass., assignor, by mesne assignments, to the United States of America as represented by the Secretary of the Navy
Filed Mar. 21, 1963, Ser. No. 267,064
6 Claims. (Cl. 340—261)

The present invention relates to a safety flight flutter damper and more particularly to a flight flutter damper which will indicate and limit the build-up of damaging vibrations during testing operation of an aircraft.

This invention pertains to a piece of test equipment for use in the flight flutter testing of aircraft engine systems. Prior to this invention, flight flutter testing, has been extremely hazardous due to the inaccuracies of the measurements possible and the certainty of total aircraft destruction if the flutter speed was inadvertently attained. With the present invention installed, the flutter speed is attainable and also measurable without danger to the aircraft or its pilot.

An object of the persent invention is the provision of a flight flutter damper which will permit safe flight flutter testing of an aircraft.

Another object is to provide a damper which will indicate to the pilot the presence of a flight flutter condition.

A further object of the invention is the provision of a friction damper in which the damping force is independent of frequency.

Still another object is the provision of a damper which is capable of dissipating the energy which is generated by the vibrations.

A further object is the provision of a damper which is inexpensive to manufacture and made of replaceable parts should replacement become necessary.

Other objects and many of the attendant advantages of this invention will be readily appreciated as the same becomes better understood by reference to the following detailed description when considered in connection with the accompanying drawings wherein.

Figure 1:
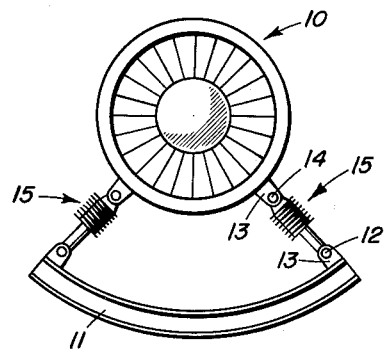
FIG. 1 is a front elevational view of an aircraft engine illustrating the relationship of the damper with respect to the mounting beam.

Referring now to the drawings, wherein like reference characters designate like or corresponding parts throughout the several views, there is shown in FIG. 1 an aircraft engine 10 and a mounting beam 11 with a vibration damper 15 positioned therebetween. The dampers 15 are each fastened to a clevis 12 on the beam 11 and another clevis 13 mounted on the engine 10. Dampers 15 are provided with spherical bearings 14 which will permit axial thermal expansion and radial motion of the engine 10 perpendicular to each damper 15. The axes of the two dampers are at right angles to each other to insure that motions of the engine 10 in any directions are damped.

Figure 2:
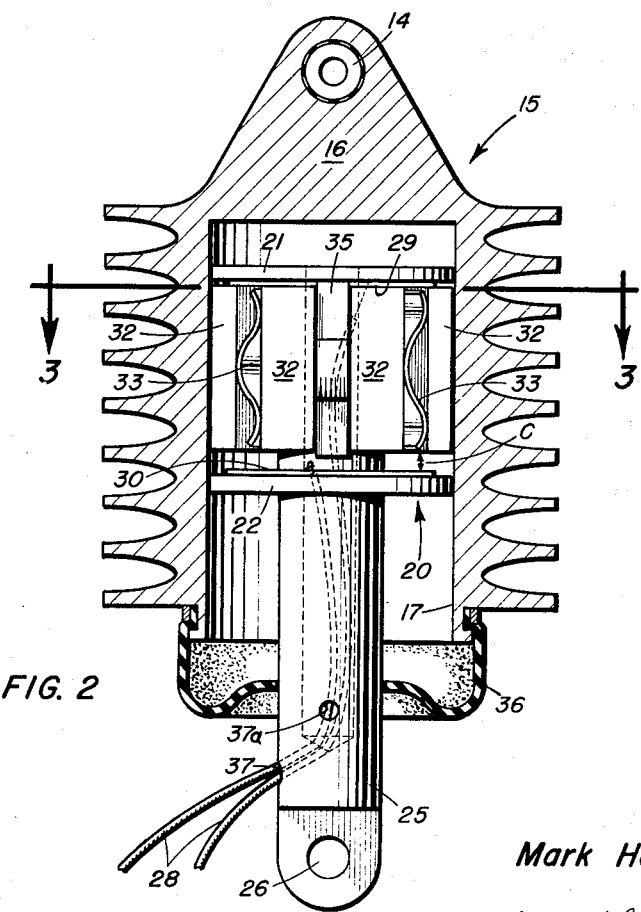
FIG. 2 is a front view of the device with a portion of housing removed.

In the preferred form of this invention, as shown in FIG. 2, the damper 15 is provided with a housing 16.

Housing 16 is provided with a centrally located bore 17 which opens at the bottom thereof. The upper portion of the housing 16 has a spherical bearing 14 mounted therein. The sides of the housing 16 are formed by a plurality of fins 17 which serve to dissipate any heat generated by the damper 15.

Disposed within bore 17 is piston 20 which has an upper flange 21 and a lower flange 22 with an undercut portion 23 therebetween. The outer edge of the flanges 21 and 22 have a plastic material 24 bonded to its edge. The material used may be Teflon, Rulon or any other suitable material. The piston 20 has a rod portion 25 which terminates with an eye 26 for mounting purposes. The center of the piston 20 and rod 25 has a bore 27 extending therethrough, as shown in dotted lines. Through bore 27 is fed the electrical leads 28 which are soldered to contact rings 29 and 30 which are located on the under side of upper flange 21 and the upper side of lower flange 22, respectively.

Intermediate upper flange 21 and lower flange 22 are four friction segments 32 which are spring loaded by springs 33. It is to be noted that segments 32 are shorter than the vertical distance between the upper flange 21 and lower flange 22, thus leaving a clearance C, the purpose of this clearance will be more clearly set forth below. One of the segments 32 is provided with an undercut portion 34 on three sides. The purpose of this undercut portion 34 is to receive a contact strip 35 which fits therein.

The lowermost end of bore 17 is sealed by a flexible dust excluder 36 which is secured to the housing 16 and snugly surrounds the piston rod 25 thus preventing any foreign matter from getting up into the working parts of the device. Rod 25 is provided with an aperture 37 through which leads 28 enter into the rod 25 and a pair of apertures 38 are provided to permit the leads 28 to contact their respective contact rings, 29 and 30. Rod 25 is also provided with a vent hole 37a at the bottom of piston bore 27. The purpose of vent 37a is to vent the air trapped at the upper end of bore 17 as piston 20 moves upwardly. When the damper 15 is mounted in position, as shown in FIG. 1, the load is carried by the wall of the housing 16 and the piston 20. It is to be noted that the flanges 21 and 22 are coated with a wear-resistant material such as Teflon and the segments 32 are also made of a like material.

Figure 3:
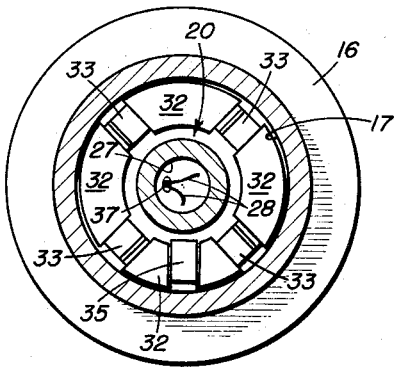
FIG. 3 is a sectional view of the device taken along the line 3—3 of FIG. 2.

FIG. 3, which is a sectional view of FIG. 2, illustrates the relationship of the segments 32 with respect to piston 20 and housing 16. This view clearly shows the manner in which springs 33 function to urge segments 32 apart and radially outward to the wall of housing 16.

Figure 4:
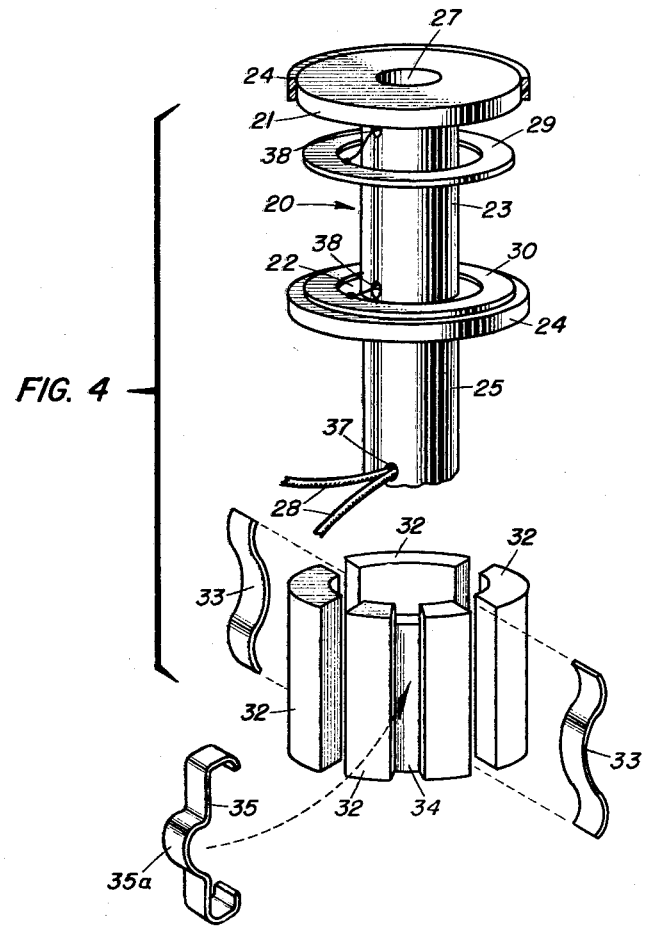
FIG. 4 is an exploded view of a preferred embodiment, illustrating the various elements of the devices.

FIG. 4, which is an exploded view of the device without the housing 16, clearly shows the various elements. Before contact rings 29 and 30 can be mounted on their respective flanges, some insulating material must be inserted therebetween. Perhaps several coats of lacquer on the surface of flanges 21 and 22 would serve to insulate and bond the contact rings 29 and 30 to their respective flanges.

Upper contact ring 29 has been lowered in order to illustrate its location with respect to upper flange 21.

Figure 5:
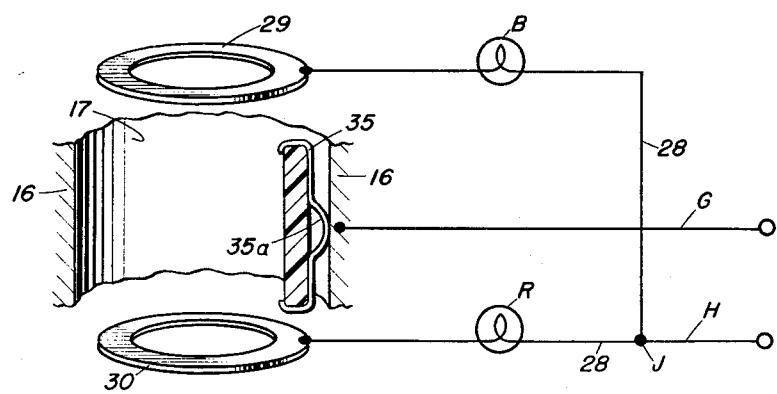
FIG. 5 is a schematic of the electrical circuit used in the device.

FIG. 5 schematically illustrates the electrical circuit used in the device. Lead G is the ground which is connected to the housing 16. Lead H which is the hot lead supplying current to upper and lower contact rings, 29 and 30, respectively. At junction point J lead H becomes two leads 28. In each of leads 28 there is a lamp, B or R, which will light up when circuit is completed via the contact ring 29 or 30, contact the strip 35, and the housing wall 16 back to ground. When the piston 20 is in its upper position, contact strip 35 will contact upper contact ring 29. Similarly, when piston 20 is in its lower position, contact strip 35 will contact lower contact ring 30 thus completing its circuit and lighting bulb R.

In order to more fully present the operation of the device an operational description follows:

As indicated above, the invention has a twofold purpose (1) the device will serve as a warning indicator to the pilot of aircraft indicating that flutter speed is attained and (2) the clearance within damper having been used up, that damper functions to limit further build-up of vibrations preventing damage to the aircraft.

The above functions are accomplished by the damper 15 being installed in an aircraft and mounted in the position shown. With the damper 15 so installed, the motions of the piston 20 relative to housing 16 are completely free until the clearance C is used up. Further motion of the piston 20 is then resisted by the frictional force generated by the pressure of segments 32 against the wall of housing 16. Segments 32 are spring loaded against the wall of housing 16 by means of leaf springs 33, between each segment 32 is interposed a spring 33. One of segments 32 is notched on three faces to receive contact strip 35, the strip 35 is bowed at 35a to make electrical contact with housing wall and one or the other of contact rings 29 and 30. When the strip 35 contacts one ring, 29 or 30, it completes one circuit which lights up a blue or red light in the cockpit of the aircraft depending upon which contact ring is contacted. When strip 35 contacts the other ring, it lights up the other light in the cockpit. Thus, a large amplitude vibration, e.g., flutter, which exceeds the damper clearance C, immediately causes the blue and red lights to flash in rapid succession in the cockpit. This is a clear flutter signal on which the pilot should take corrective action, such as reduce the aircraft speed and propeller r.p.m.

In some installations of the device, the rear engine mount moves as the thrust increases from zero to take off. When this happens, only one of the lights will go on for the entire duration of the acceleration as the damper piston 20 changes its mean position. Such an indication can readily be differentiated from flutter.

It is to be noted that for small, normal vibrations the damper is inoperative, due to the fact that the piston 20 is moving up and down within clearance C. As soon as flutter starts, the amplitudes build up until the clearance is used up and damping starts. The energy dissipated by the damper limits further build-up of amplitudes which will stabilize at a level at which the energy dissipated by the damper 15 will exactly balance the energy extracted from the air. The dissipation of friction energy by the damper occurs at the cylinder wall. Since the thermal conductivity of Teflon or any similar material, is much less than that of aluminum, most of the heat will be immediately rejected through the aluminum fins 18. The short heat flow path and fins will permit the wear surfaces to operate cooler and last longer. As an alternative, the variation of friction force with temperature can be adjusted by substituting a bimetallic leaf spring for an ordinary leaf spring. A bimetallic leaf spring could be designed either to increase the spring force with temperature and, thereby, reduce amplitudes or it could be designed to reduce the spring force if the damper were in danger of self destruction due to over-temperature.

Obviously many modifications and variations of the present invention are possible in the light of the above teachings. It is therefore to be understood that within the scope of the appended claims, the invention may be practiced otherwise than as specifically described.

What is claimed is:

1. In an aircraft having a mounting beam, an engine mounted on said mounting beam, supports positioned between said engine and said mounting beam, the improvement comprising;
    a plurality of flutter indicating and damping supports mounted between said engine and said mounting beam with the axis of each at right angles to the other,
    each of said flutter indicating and damping supports having a housing with a mounting aperture located at one end thereof,
    a centrally located bore extending into said housing from said other end,
    a plurality of fins arranged about the outer portion of said housing,
    piston means operably mounted within said bore,
    said piston means fixedly secured at one end to said mounting beam,
    inactivating means cooperating with said piston means for delaying the damping effect of said damping supports,
    electrical means operably connected to said piston means for passing a flow of electrical current when said piston means reciprocates with sufficient amplitude which is indicative of a flutter condition,
    indicating means connected to said electrical means which will indicate a flutter condition whereby the pilot of the aircraft may take the necessary action when said indicating means is energized.

2. In a device of the character described in claim 1 wherein said piston means comprises;
    a piston having an upper and lower flange with a reduced diameter portion therebetween,
    a rod portion integral with and extending downward from said lower flange portion,
    a centrally located bore extending inwardly from the upper surface of said piston,
    a plurality of segments disposed about said reduced diameter portion,
    electrical insulating means disposed about the periphery of said upper and lower flanges,
    biasing means disposed between each of said segments whereby said biasing means urges said segments outwardly toward the inner wall of said bore in said housing.

3. In a device of the character described in claim 2 wherein said electrical insulating means comprises;
    an annular ring of insulating material which is bonded to said upper and lower flanges providing insulation between said housing wall and said piston flange,
    said biasing means comprises a plurality of S-shaped leaf springs,
    each of said springs being of a length equal to the length of said segments.

4. In a device of the character described in claim 1 wherein said inactivating means comprises a plurality of non-conducting segments which are disposed about said piston means between the ends thereof,
    said non-conducting segments having a length which is less than the distance between said ends of said piston means, thus the travel of said piston is required to exceed this distance before said piston has a damping effect on the engine to which it is mounted.

5. In a device of the character described in claim 2 wherein said electrical means comprises,
    a contact ring mounted on the underside of said upper flange and insulated therefrom,
    a contact ring mounted on the upper face of said lower flange and insulated therefrom,
    a contact strip attached to one of said segments, and in contact with said housing wall,
    electrical leads attached to each of said contact rings,
    said housing wall being electrically grounded whereby movement of said piston up or down a sufficient distance brings said upper or lower contact ring into contact with said contact strip thus completing an electrical circuit.

6. In a device of the character described in claim 2 wherein said indicating means comprises,
a first colored light bulb which is connected to one of said electrical leads,
a second light bulb of a different color than said first bulb which is connected to the other of said electrical leads, whereby a rapid reciprocation of said piston beyond the required distance will cause a rapid blinking of said lights indicating a flutter condition.

References Cited in the file of this patent
UNITED STATES PATENTS
2,845,503     Durand _____ July 29, 1958